(12) United States Patent
Kapatralla et al.

(10) Patent No.: US 10,805,774 B2
(45) Date of Patent: Oct. 13, 2020

(54) METHODS AND APPARATUS FOR MANAGING CONTROL DATA

(71) Applicant: SAMSUNG ELECTRONICS CO., LTD., Suwon-si (KR)

(72) Inventors: Irshad Ahamed Kapatralla, Bangalore (IN); Naveen Devanahalli Balakrishna, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/846,499

(22) Filed: Dec. 19, 2017

(65) Prior Publication Data
US 2018/0176746 A1  Jun. 21, 2018

(30) Foreign Application Priority Data
Dec. 19, 2016  (IN) .............................. 201641043356

(51) Int. Cl.
*H04W 4/10* (2009.01)
*G10L 13/04* (2013.01)
(Continued)

(52) U.S. Cl.
CPC ............. *H04W 4/10* (2013.01); *G10L 13/043* (2013.01); *H04L 65/1006* (2013.01);
(Continued)

(58) Field of Classification Search
CPC ..... H04W 4/10; H04W 76/45; H04W 88/181; H04W 52/027; H04W 84/08
See application file for complete search history.

(56) References Cited

U.S. PATENT DOCUMENTS

| 7,076,675 B2 | 7/2006 | Martinez Perez et al. |
| 2007/0109258 A1* | 5/2007 | Hendrik Weinans ....................... G06F 1/1626 345/156 |

(Continued)

FOREIGN PATENT DOCUMENTS

| EP | 1 655 977 A1 | 5/2006 |
| WO | 2007/081172 A1 | 7/2007 |
| WO | 2009/134589 A2 | 11/2009 |

OTHER PUBLICATIONS

Communication dated Apr. 4, 2018 by the International Searching Authority in counterpart International Patent Application No. PCT/KR2017/014940. (PCT/ISA/210).
(Continued)

*Primary Examiner* — Keith Ferguson
(74) *Attorney, Agent, or Firm* — Sughrue Mion, PLLC

(57) ABSTRACT

Methods and systems for managing control data in a push-to-talk over cellular (PoC) communication are provided. A method includes: receiving, by a user equipment (UE), control data from a PoC server on a control plane and/or a data plane for a PoC session. The control data is not limited to a text control data, but also can include an audio control data and/or an image control data. Further, the method includes processing the received control data and sending the processed control data from a communication processor (CP) to an audio device and/or an always on display of the UE through a direct communication channel set up between the CP and a low power processor (LPP), without waking up an application processor (AP) of the UE. Thus, the method effectively reduces battery consumption of the UE to lowest possible level.

19 Claims, 16 Drawing Sheets

(51) Int. Cl.
*H04W 52/02* (2009.01)
*H04L 29/06* (2006.01)
*G10L 13/00* (2006.01)

(52) U.S. Cl.
CPC ...... *H04L 65/1059* (2013.01); *H04L 65/4061* (2013.01); *H04W 52/027* (2013.01); *G10L 13/00* (2013.01); *Y02D 70/00* (2018.01); *Y02D 70/1262* (2018.01); *Y02D 70/142* (2018.01); *Y02D 70/168* (2018.01); *Y02D 70/20* (2018.01); *Y02D 70/26* (2018.01)

(56) References Cited

U.S. PATENT DOCUMENTS

| | | | |
|---|---|---|---|
| 2007/0150286 A1* | 6/2007 | Miller | G10L 15/30 704/270.1 |
| 2007/0155346 A1* | 7/2007 | Mijatovic | H04W 4/18 455/90.2 |
| 2008/0139251 A1 | 6/2008 | Yamaguchi | |
| 2009/0047915 A1* | 2/2009 | Albertsson | H04W 4/10 455/90.2 |
| 2009/0276214 A1 | 11/2009 | Chong et al. | |
| 2010/0030557 A1 | 2/2010 | Molloy et al. | |
| 2013/0029708 A1* | 1/2013 | Fox | H04W 28/08 455/509 |
| 2014/0278443 A1* | 9/2014 | Gunn | G10L 17/24 704/275 |
| 2014/0349626 A1 | 11/2014 | Bishop, Jr. et al. | |
| 2015/0066511 A1* | 3/2015 | Baek | H04N 5/23293 704/260 |
| 2015/0148084 A1 | 5/2015 | Arkko et al. | |
| 2015/0281916 A1 | 10/2015 | Park et al. | |
| 2016/0049106 A1* | 2/2016 | Connell | G06F 1/3206 345/207 |
| 2016/0183144 A1* | 6/2016 | Vallabhu | H04W 36/0011 370/331 |
| 2017/0131778 A1* | 5/2017 | Iyer | G06F 1/1688 |

OTHER PUBLICATIONS

Communication dated Apr. 4, 2018 by the International Searching Authority in counterpart International Patent Application No. PCT/KR2017/014940. (PCT/ISA/237).

Paul K.; "Note 7: the Always-on display gets an upgrade, becomes much more useful", Retrieved on Jan. 1, 2017, URL: http://www.phonearena.com/news/Note-7-the-Always-on-display-gets-an-upgrade-becomes-much-more-useful_id83778; (4 pages total).

"3rd Generation Partnership Project; Technical Specification Group Services and System Aspects; Functional architecture and information flows to support mission critical communication services; Stage 2(Release 13)", A Global Initiative, 3GPP TS 23.179 V13.4.0 (Dec. 2016), (229 pages total).

"3rd Generation Partnership Project; Technical Specification Group Core Network and Terminals Mission Critical Push to Talk (MCPTT) media plane control; Protocol specification (Release 14)", A Global Initiative, 3GPP TS 24.380 V14.1.0 (Dec. 2016), (240 pages total).

Russell Holly: "What an 'Always-On' display means for battery life on Android"; retrieved on Nov. 20, 2017, URL: https://www.androidcentral.com/what-always-display-means-battery-life-android, (6 pages total).

"Rich Communication Suite 6.0 Advanced Communications Services and Client Specification Version 7.0—final draft", GSM Association, Feb. 19, 2016, (581 pages total).

Campbell et al: "The Message Session Relay Protocol (MSRP)", RFC 4975, Sep. 2007, (63 pages total).

"OMA PoC System Description", Approved Version 2.1, Aug. 2, 2011, Open Mobile Alliance, OMA-TS-PoC_System_Description-V2_1-20110802-A, (421 pages total).

"Push to talk over Cellular (PoC)—Architecture", Candidate Version 2.0, Feb. 26, 2008, Open Mobile Alliance, OMA-AD-PoC-V2_0-20080226-C, (54 pages total).

"PoC User Plane", Approved Version 2.1, Aug. 2, 2011, Open Mobile Alliance, OMA-TS-PoC_UserPlane-V2_1-20110802-A, (378 pages total).

Communication dated Feb. 10, 2020 issued by the Indian Intellectual Property Office in Indian counterpart Application No. 201641043356.

Communication dated Oct. 15, 2019, from the European Patent Office in counterpart European Application No. 17885330.5.

* cited by examiner

METHODS AND APPARATUS FOR MANAGING CONTROL DATA

CROSS-REFERENCE TO RELATED APPLICATION

This application claims priority from Indian Patent Application No. 201641043356, filed on Dec. 19, 2016 in the Indian Patent Office, the entire disclosure of which is hereby incorporated by reference.

FIELD

Apparatuses and methods consistent with one or more exemplary embodiments relate to push-to-talk over cellular (PoC) communication, and more particularly to managing control data in the PoC communication.

BACKGROUND

Current developments in push-to-talk (PTT) technology have enabled PTT over cellular (PoC) communication, which provides related art PTT as an application on a user equipment (UE) in a cellular communication network. The PoC communication enables improved team coordination and efficiency by providing features such as reduced communication costs, global coverage, low latency, and an option to instantly communicate with all team members. One of the major advantage of PoC over related art PTT is the ability to work over any Internet Protocol (IP)-based data network such as 2.5G, 3G, long term evolution (LTE), local area network (LAN), wide area network (WAN), Wi-Fi, and so on, yielding a significantly larger coverage area. A PoC service offered by a UE is compatible with a wide range of UEs and users can utilize their own UEs.

The PTT functionality enables setting up communication among two or more users in a half-duplex manner, wherein one user, referred as PTT speaker, is in control of a floor at a given instant (i.e., which user can speak during the PoC session at a given instant) while one or more other users, referred as PTT listeners, listen to the PTT speaker in a PoC session established by a PoC server. Various control messages between the PoC server and the UE, participating in the PoC session as a PTT listener or the PTT speaker, are logically split as control data over a control plane and user data over a data plane. The control plane carries signaling messages/protocol messages. For a PTT call (PoC session), the control signaling uses media burst control protocol (MBCP) for all floor control related events (acquire/release and the like). Related art MBCP, as defined in open mobile alliance (OMA) specifications, is only text based, utilizing a text control data. Further, the data plane is used to carry user data or actual traffic where voice/video data is transmitted. The PTT call over session initiation protocol (SIP) uses real time protocol (RTP)/secure RTP for voice/video data. This user data (for example, speech), when received by the UE over the data plane, is processed by vocoders for delivering audio output to a speaker.

With related art methods, as specified in a communication standard, control data carries notifications/requests/responses to participants (users of the UEs) keeping them informed about important events such as a current PTT speaker of an ongoing PoC session and the like. The notifications, also referred to as PTT floor control notifications, in the control data are first received at a communication processor (CP) of the UE. The notifications, in the text format, are then extracted from the control data. Related art UEs are equipped with only an application processor (AP) to manage a display of the UE. In such cases, the CP forwards the extracted text data to the AP for displaying on the display. With a need for reduced power consumption, UEs equipped with an always on display feature that consumes low power have been developed. These UEs include a low power processor (LPP) that manages the always on display. In such cases, a UE having an always on display can utilize the always on display for text PTT notifications. However, the PTT notifications still have to be channeled through the AP, the LPP, and then the always on display.

Thus, whether the UE is the related art UE or a UE equipped with the always on display, an incoming PTT notification/request is routed to the display via the AP. Thus, the AP is required to wake up for each control message from the CP. Frequent waking up of the AP is one of the major factors in increased power consumption of the UE. Further, whenever the user desires updates about a current situation in the ongoing PoC session (such as the current PTT speaker), the user has to frequently turn on his/her UE to read alerts on the display or watch the always on display. Each time the device is turned on, the AP wakes up to activate the display or the LPP, thereby draining a battery of the UE. As a frequency of the notifications and a number of users in the PoC session increases, a considerable amount of battery power is consumed by the AP and/or the display. The large amount of battery drain raises concerns in maintaining the UE in a working state for longer durations, effectively degrading a user experience. Further, in many scenarios, it may not be convenient for the user to divert from a current engagement, turn on the UE, and get updated on received notifications.

Further, in normal scenarios with a UE used for non-PTT applications or during a normal operation of the UE, the UE's display turns on automatically, even without user intervention, due to unsolicited events/changes such as an incoming call, a message, a notification alert, an alarm, and the like. This is a major cause of battery drain during a normal operation of the UE.

The above information is presented as background information only to assist with an understanding of the present disclosure. No determination has been made, and no assertion is made, as to whether any of the above might be applicable as prior art with regard to the present disclosure.

SUMMARY

Aspects of one or more exemplary embodiments provide methods and systems for managing control data in a push-to-talk over cellular (PoC) communication, wherein the control data transmitted to a user equipment (UE) by a PoC server for a PoC session can be on a control plane and/or a data plane.

Aspects of one or more exemplary embodiments also provide methods and systems for processing the control data at a communication processor (CP) of the UE, wherein the control data received over the control plane and/or the data plane can be at least one of a text control data, an audio control data, and an image control data.

Aspects of one or more exemplary embodiments also provide methods and systems for sending the processed control data from the CP to an audio device and/or an always on display of the UE to alert a user of the UE of one or more incoming push-to-talk floor control notifications through sound notifications, and/or display notifications restricted to the always on display, effectively reducing battery consumption of the UE to lowest possible level.

Aspects of one or more exemplary embodiments also provide methods and systems for forwarding the processed control data to the audio device and/or the always on display through a direct communication channel set up between the CP and a low power processor (LPP) without waking up an Application Processor (AP) of the UE, wherein the communication over the direct communication channel is based on a pre-defined CP-LPP inter-process communication (IPC).

Aspects of one or more exemplary embodiments also provide methods and systems to allow usage of the direct communication channel set up between the CP and LPP for UE applications other than the PoC communication.

According to an aspect of an exemplary embodiment, there is provided a method for managing control data in a push-to-talk over cellular (PoC) communication, the method including: receiving on at least one of a control plane and a data plane, by a communication processor (CP) of a user equipment (UE), control data for a PoC session from a PoC server; and processing, by the CP, the received control data, wherein the processing comprises at least one of converting the control data of text format received on the control plane to a data of audio format or forwarding the control data of text format to an always on display via a low power processor (LPP) of the UE.

The processing may further include at least one of: forwarding the control data of text format to the always on display through a communication channel set up between the CP and the LPP; forwarding the converted data of audio format to an audio device; based on receiving the control data of audio format on the control plane, forwarding the received control data of audio form to the audio device; and based on receiving the control data of image format on the control plane, forwarding the received control data of image format to the always on display for rendering via the LPP.

Communication over the communication channel between the CP and the LPP may be in accordance with a pre-defined CP-LPP inter-process communication (IPC).

The control data of audio format is multiplexed with a user data of the data plane if the control data of audio format is received by the UE on the data plane; and the PoC server transmits the control data of audio format multiplexed with the user data to the UE incapable of text-to-speech conversion.

A capability of the UE with respect to the text-to-speech conversion may be transmitted to the PoC server through a capability negotiation during registration of the UE with the PoC server for the PoC communication.

The processing may further include: demultiplexing the control data of audio format from the user data of the data plane; identifying silence gaps in the user data of the data plane; and playing the demultiplexed control data of audio format on an audio device before playing the user data or during the silence gaps identified in the user data.

The control data may include at least one of the control data of audio format and the control data of image format, and wherein the control data of audio format indicates the current PTT speaker of the PoC session in an audio format, and the control data of image format indicates the current PTT speaker of the PoC session in an image format.

The UE may receive, process, and output the control data without waking up an application processor of the UE.

According to an aspect of another exemplary embodiment, there is provided a user equipment (UE) for managing control data in a push-to-talk over cellular (PoC) communication, the UE including: a communication processor (CP) including a push-to-talk (PTT) controller; an application processor (AP); a low power processor (LPP); and a display, wherein the CP is configured to: receive on at least one of a control plane and a data plane, by a communication processor (CP) of a user equipment (UE), control data for a PoC session from a PoC server; and process, by the CP, the received control data, wherein the processing of the CP comprises at least one of converting the control data of text format received on the control plane to a data of audio format or forwarding the control data of text format to an always on display via a low power processor (LPP) of the UE.

The PTT controller of said CP may be configured to perform at least one of: forwarding the control data of text format to the always on display through a communication channel set up between the CP and the LPP; forwarding the converted data of audio format to an audio device; based on receiving the control data of audio format on the control plane, forwarding the received control data of audio form to the audio device; and based on receiving the control data of image format on the control plane, forwarding the received control data of image format to the always on display for rendering via the LPP.

Communication over the communication channel between the CP and the LPP may be in accordance with a pre-defined CP-LPP inter-process communication (IPC).

The control data of audio format may be multiplexed with a user data of the data plane if the control data of audio format is received by the UE on the data plane; and the PoC server transmits the control data of audio format multiplexed with the user data to the UE incapable of text-to-speech conversion.

The PTT controller may be configured to transmit a capability of the UE with respect to the text-to-speech conversion to the PoC server through a capability negotiation during registration of the UE with the PoC server for the PoC communication.

The CP may be configured to process the audio control data received on the data plane by performing processing including: demultiplexing the control data of audio format from the user data of the data plane; identifying silence gaps in the user data of the data plane; and playing the demultiplexed control data of audio format on an audio device before playing the user data or during the silence gaps identified in the user data.

The display may be an always on display.

The control data may include at least one of the control data of audio format and the control data of image format, and the control data of audio format may indicate the current PTT speaker of the PoC session in an audio format, and the control data of image format may indicate the current PTT speaker of the PoC session in an image format.

According to an aspect of another exemplary embodiment, there is provided a push-to-talk over cellular (PoC) server for managing control data in a PoC communication, the PoC server including: a push-to-talk (PTT) control data manager configured to transmit, to a user equipment (UE) if the UE is a PTT listener UE, the control data for a PoC session on at least one of a control plane and a data plane, wherein the control data includes at least one of a control data of text format, a control data of audio format, and a control data of image format.

The PTT control data manager may be configured to transmit, to the UE incapable of text-to-speech conversion, the control data of audio format on the data plane by multiplexing with user data on the data plane.

The PTT control data manager may be configured to receive a capability of the UE with respect to the text-tospeech conversion through a capability negotiation during registration of the UE with the PoC server for the PoC communication.

The PTT control data manager may be configured to: convert control data received from a PTT speaker UE to control data of audio format; identify silence gaps in the user data of the data plane; and multiplex the converted control data of audio format with the user data of the data plane; and transmit the multiplexed data on the data plane to the PTT listener UE.

According to an aspect of another exemplary embodiment, there is provided a non-transitory computer-readable recording medium having recorded thereon a program executable by a computer for performing the method.

These and/or other aspects will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of exemplary embodiments herein without departing from the spirit of the inventive concept(s), and exemplary embodiments include any such modifications.

BRIEF DESCRIPTION OF THE DRAWINGS

Exemplary embodiments are illustrated in the accompanying drawings, throughout which like reference numerals indicate corresponding parts in the various figures. Exemplary embodiments described herein will be better understood from the following description with reference to the drawings, in which.

DETAILED DESCRIPTION

Figure 1:
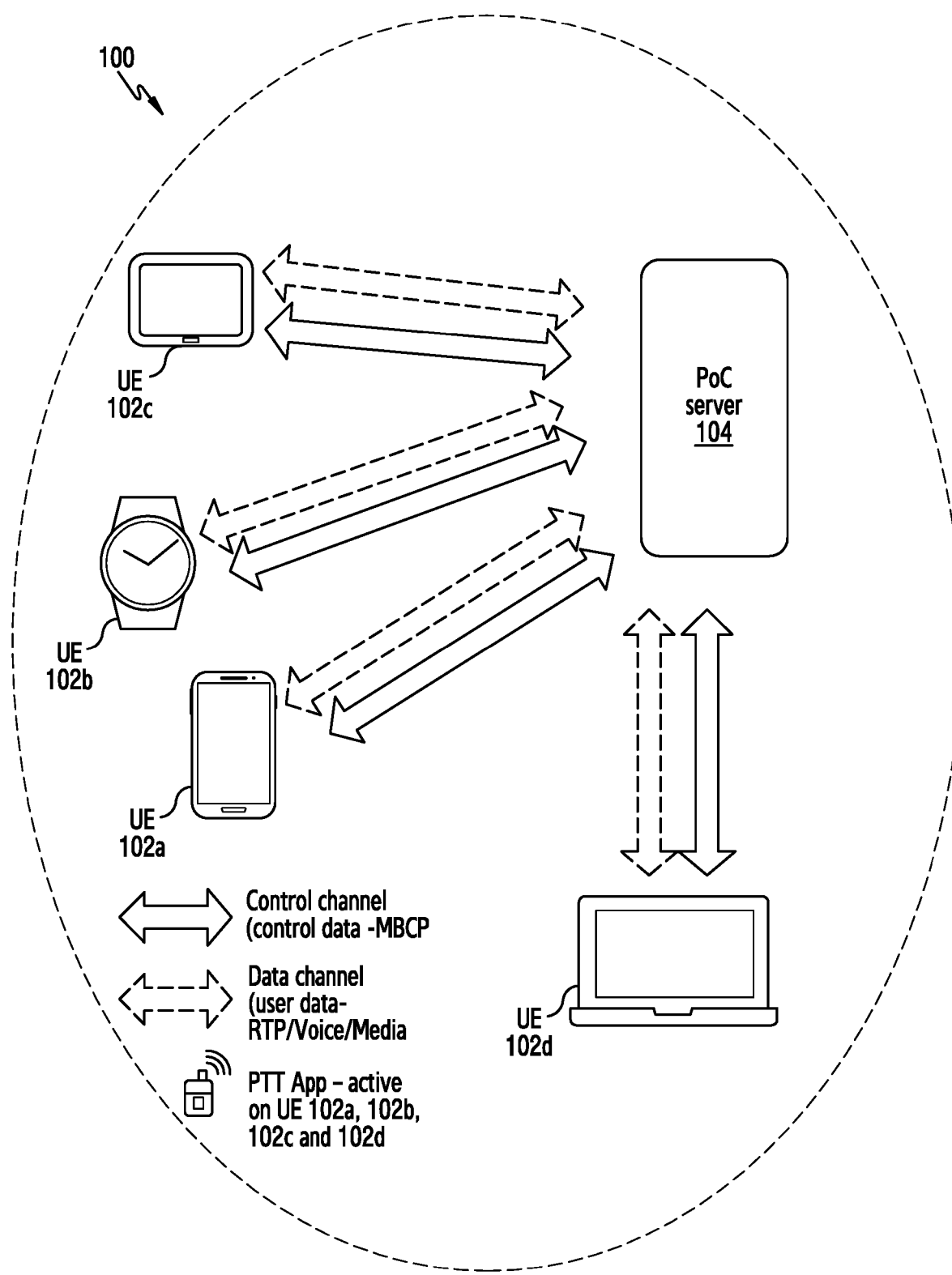
FIG. 1 illustrates an overview of an example PoC communication system, according to an exemplary embodiment.

Exemplary embodiments and the various features and advantageous details thereof are explained more fully with reference to the non-limiting exemplary embodiments that are illustrated in the accompanying drawings and detailed in the following description. Descriptions of well-known components and processing techniques are omitted so as to not unnecessarily obscure exemplary embodiments herein. The examples used herein are intended merely to facilitate an understanding of ways in which exemplary embodiments herein may be practiced and to further enable those skilled in the art to practice exemplary embodiments herein. Accordingly, the examples should not be construed as limiting the scope of exemplary embodiments herein.

As used herein, the term "and/or" includes any and all combinations of one or more of the associated listed items. Additionally, expressions such as "at least one of," when preceding a list of elements, modify the entire list of elements and do not modify the individual elements of the list.

One or more exemplary embodiments relate to methods and systems for managing control data in a push-to-talk over cellular (PoC) communication. A method according to an exemplary embodiment includes receiving, by a user equipment (UE), the control data from a PoC server on a control plane and/or a data plane for a PoC session. The control data is not limited to a text control data, but also can include an audio control data and/or an image control data. The UE may be an electronic device. An electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD), electronic clothes, electronic braces, an electronic necklace, an electronic appcessory, an electronic tattoo, or a smart watch), and/or the like. An electronic device may be a smart home appliance with communication functionality. A smart home appliance may be, for example, a television, a digital video disk (DVD) player, an audio device, a refrigerator, an air conditioner, a vacuum cleaner, an oven, a microwave oven, a washer, a dryer, an air purifier, a set-top box, a TV box (e.g., SAMSUNG HOMESYNC, APPLE TV, or GOOGLE TV), a gaming console, an electronic dictionary, an electronic key, a camcorder, an electronic picture frame, and/or the like.

Further, the method includes processing the received control data and forwarding the processed control data from a communication processor (CP) of the UE to an audio device and/or an always on display (e.g., a SAMSUNG ALWAYS ON display, a display that is always or relatively frequently on when the UE is on, or a display that has one or more portions that are always or relatively frequently on when the UE is on) of the UE to alert a user of the UE of one or more incoming notifications. The processed control data can be forwarded to the audio device and/or the always on display through a direct communication channel set up between the CP and a low power processor (LPP) without waking up an application processor (AP) of the UE. The communication over the direct communication channel is in accordance with a pre-defined CP-LPP inter-process communication (IPC). The sound notifications, generated by converting text control data to audio control data, or receiving control data directly as audio control data, reduce unnecessary activation of the display for alert notifications. Further, using display notifications restricted to the always on display effectively reduces battery consumption of the UE to a minimal or least possible level. It is understood that while one or more exemplary embodiments described herein are with reference to a UE include an always on display, one or more other exemplary embodiments are not limited thereto and are applicable to devices without an always on display or with a display that does not have always on functionality.

According to an exemplary embodiment, the method further provides managing the on/off state of the always on display, assisting further power saving. The method includes detecting one or more pre-defined events such as input from a proximity sensor on the UE, device state of the UE, inputs from motion sensors on the UE and so on. Upon detection of these one or more events the always on display may be turned off to enable further power saving.

According to an exemplary embodiment, the audio control data received from the PoC server can be additionally converted to an image control data at the UE and displayed as an image, wherein the image can be a pre-defined image. In an exemplary embodiment, the image control data received from the PoC server can be converted to a corresponding audio data that can be played on the audio device of the UE.

According to an exemplary embodiment, the UE can be a mobile phone, a smart phone, a laptop, a palmtop, a computer, a wearable computing device, a tablet, or any other communication device capable of PoC communication.

Referring to the drawings, and more particularly to FIGS. 1, 2, 3A through 3D, 4A, 4B, 5A, 5B, 6A, 6B, 7, 8, 9A through 9D, and 10 through 12, where similar reference characters denote corresponding features consistently throughout the figures, one or more exemplary embodiments will now be described.

FIG. 1 illustrates an overview of an example PoC communication system 100, according to an exemplary embodiment. The PoC communication system 100 depicts a plurality of users (participants in a PoC session), each associated with a UE, namely, UE 102a, UE 102b, UE 102c, UE 102d, etc., respectively. The PoC session is managed by a PoC server 104. In the PoC session, any user (e.g., a user of UE 102d), can take on the PTT floor and be a PTT speaker, while other UEs (e.g., UE 102a, UE 102b, and UE 102c) participating in the PoC session are PTT listeners. All control data, for example PTT floor notifications, to be communicated between the participants is generally sent by the PoC server 104 over a control channel. Meanwhile, the user data, such as user voice data/media, is sent over a data channel. In the PoC communication system 100 according to an exemplary embodiment, the PoC server 104 can be configured to send the control data over a control channel and/or a data channel.

According to an exemplary embodiment, in addition to related art standards where the control data is in a text format (referred to herein as text control data of control data of text format), the PoC server 104 can be configured to use an audio format (audio control data) and/or an image format (image control data or control data of image format) that can be communicated to the PTT listeners (e.g., UE 102a, 102b and 102c respectively) over the control channel. The control data transmitted over the control channel can be received by the CP of the UE (e.g., UE 102a, the PTT listener), and processed and forwarded to at least one of the audio devices such as a speaker for sound notification and/or the always on display for display notification. The UE 102a can be configured to bypass the AP for communication with the LPP as explained in conjunction with FIGS. 3A through 3D, respectively, which effectively reduces power consumption of the UE 102a as the AP can continue to stay in a sleep mode. With the text control data received by the UE 102a, the UE 102a can be configured to convert the text control data to the audio control data. The conversion is made possible by the PoC communication system 100 according to an exemplary embodiment, wherein it utilizes the capability of an IP multimedia core network subsystem (IMS) engine present in UEs for conversion of the text control data to the audio control data. The IMS engine is used by UEs for processing user data.

With the audio control data received by the UE 102a, the UE 102a is configured to process and directly provide the audio control data to the speaker for sound (audio) notification for a received PTT notification in the control data.

With the image control data received by the UE 102a, the UE 102a is configured to process the image control data and forward the processed image control data directly to the always on display through the LPP, bypassing the AP.

According to an exemplary embodiment, if the UE 102a is not capable of text-to-speech conversion (for example, does not have the IMS engine), the PoC server 104 may be configured to multiplex an audio control data with the user data on the data channel. The UE 102a capability can be identified by the PoC server 104 through PTT settings set for the UE 102a. Further, this audio control data can be demultiplexed by the UE 102a and played on the speaker. The use cases for a plurality of types of control data utilized by the PoC server 104 are explained below in conjunction with FIGS. 4A, 4B, 5A, 5B, and 9A through 9D, respectively.

Figure 2:
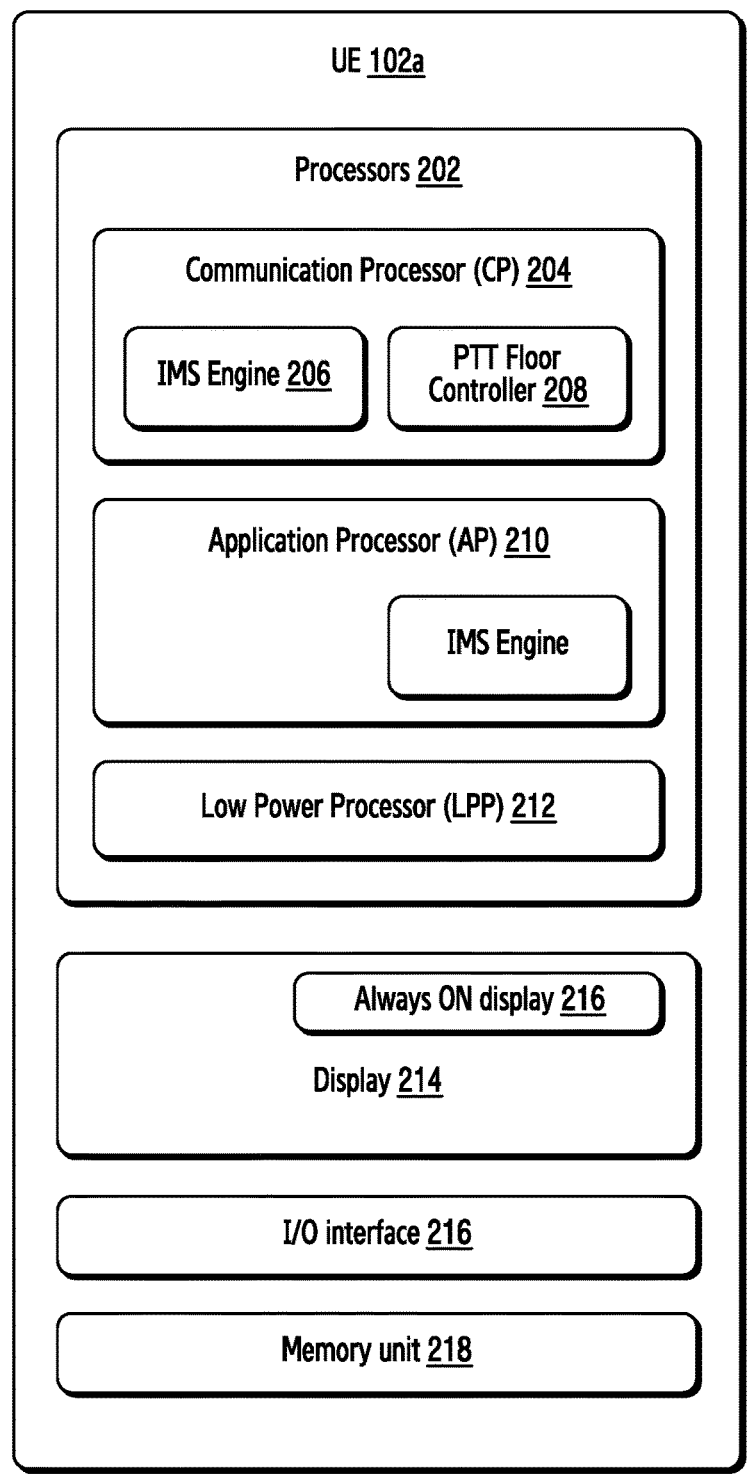
FIG. 2 illustrates a plurality of components of a User Equipment (UE) of the POC communication system, according to an exemplary embodiment.

FIG. 2 illustrates a plurality of components of a UE 102a of a POC communication system 100, according to an exemplary embodiment. Referring to FIG. 2, the UE 102a may include processors 202, including a CP 204, an AP 210, and an optional LPP 212 associated with an always on display 216 (e.g., based on a device type of the UE 102a). Further, the CP includes an IMS engine 206 and a PTT floor controller 208 for managing the control data. The IMS engine 206 in the CP 204 is configured to process the audio/video/MBCP data and the like.

The AP 210 may also include an IMS engine. The UE 102a also includes an input/output (I/O) interface 216 and a memory unit 218 (e.g., memory). The I/O interface 216 may include, for example, a web interface, a graphical user interface for a display 214, etc. Further, the I/O interface 216 may include a communication interface that allows the UE 102a 100 to communicate with other devices such as the PoC server 104, other UEs 102b through 102d, and so on through cellular networks, Wi-Fi networks, device-to-device communication and the like. The memory unit 218 may store the received control data and the processed control data and the like. The PTT floor controller 208 may be configured to manage the control data received in one or more formats. The PTT floor controller 208 may be configured to processes the text control data to generate the sound notification on the audio device and display the text notification on an always on display 216. Similarly, the audio control data is processed to generate a sound notification via the speaker, and the image control data is processed to provide a display notification on the always on display 216.

The UEs such as UE 102a, UE 102b, and the like may be configured to manage the on/off state of the always on display 216, to thereby provide further power saving. A UE may be configured to detect one or more pre-defined events such as an input from a proximity sensor on the UE, a device state of the UE, inputs from motion sensors on the UE, and so on. Upon detection of these one or more events, the always on display 216 may be turned off to enable further power saving. Some example scenarios are provided below:

Scenario 1: While the UE 102a is in a user's pocket or bag, based on inputs from a proximity sensor, the always on display 216 can be turned off.

Scenario 2: Based on inputs from motion sensors on the UE 102b, which may be a wearable device, the UE 102b may be identified to be in idle state and the always on display 216 can be turned off. For example, where the UE 102b is not worn by the user, after a particular idle time is detected, the always on display 216 may be turned off. In another example, where the UE 102b is worn by the user, the always on display 216 may be turned on only on motion detection. For example, while a watch as the UE 102b is worn, but there is no hand movement, the always on display 216 may be turned off.

As can be understood by a person skilled in the art, other UEs 102b through 102d may also include the same and/or similar components and/or functionality. Redundant descriptions are not repeated herein for purposes of brevity.

FIGS. 3A through 3D illustrate managing of control data in a UE 102a when the control data is text control data over a control plane, audio control data over the control plane, image control data over the control plane, and the audio control data over the data plane, respectively, according to one or more exemplary embodiments.

Figure 3A:
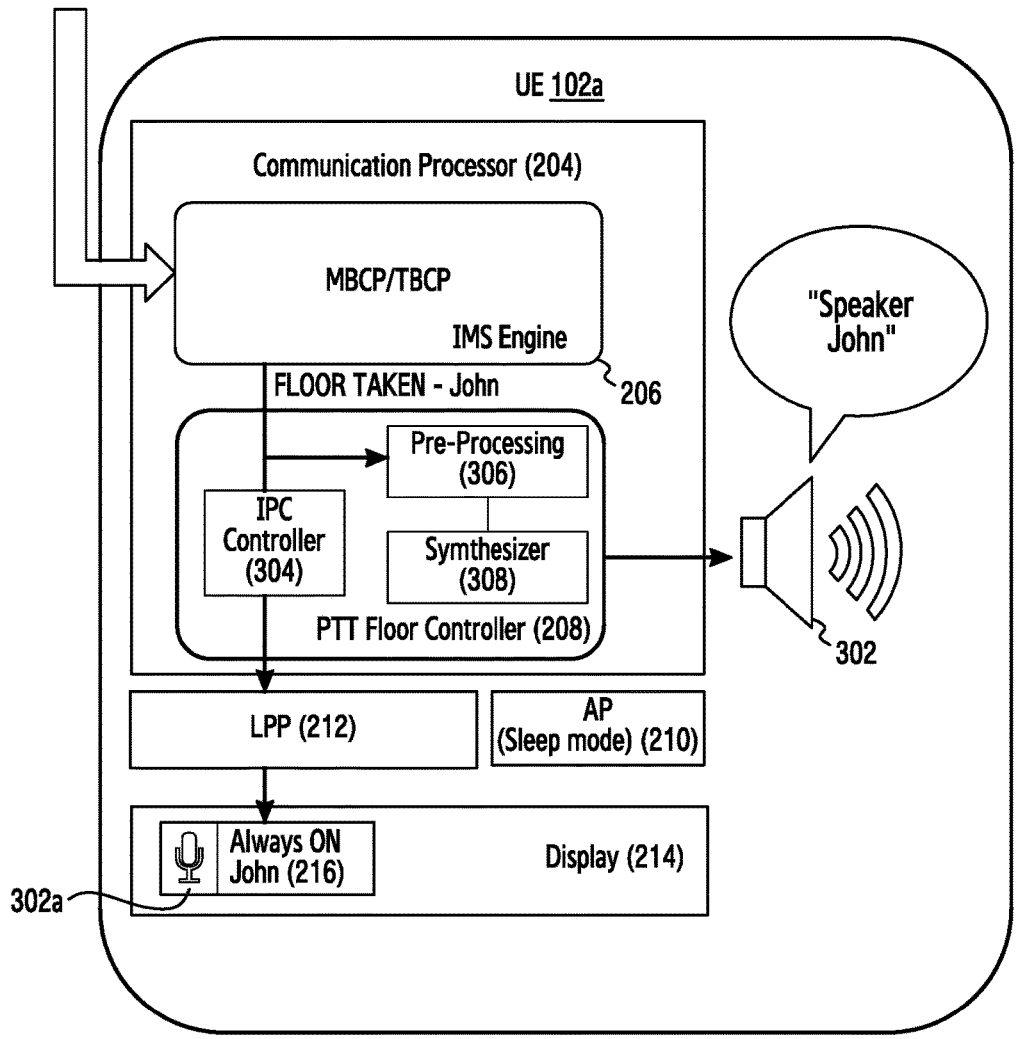
FIGS. 3A through 3D illustrate managing of control data in a UE when the control data is a control data of text format over a control plane, a control data of audio format over the control plane, a control data of image format over the control plane, and a control data of audio format over a data plane, respectively, according to one or more exemplary embodiments.

FIG. 3A depicts the UE 102a receiving the text control data over the control plane, according to an exemplary embodiment. The text control data is processed by IMS engine 206 to generate the audio control data. The PoC communication system 100 according to an exemplary embodiments enables utilizing the capability of the IMS engine 206 for processing the control data. Further, the generated audio control data is processed by a pre-processing block 306 and a synthesizer 308 of the PTT floor controller 208 to generate an output audio notification to be played on an audio device (speaker) 302. Further, the text control data may be handled by an inter process communication (IPC) controller 304 of the PTT floor controller 208. The IPC controller 306 forwards the text data directly to the LPP 212 over the direct communication channel between the CP 204 and the LPP 212 without disturbing the AP 210 that is switched to or in a sleep or idle mode. The LPP 212 processes and forwards the text control data as a display text notification on the always on display 216. For example, a PTT floor control notification informing the user of UE 102a (PTT listener) about a current PTT floor control with the user of the UE 102d (current PTT speaker) is provided to the user as a voice notification over a speaker 302 and as a display notification on the always on display 216. By way of another example, the PTT floor control notification informing the user of UE 102a (PTT listener) about the current PTT floor control with the user of the UE 102d (current PTT speaker) is provided to the user as a voice notification over the speaker 302 in a case, e.g., when the always on display 216 is turned off in scenarios 1 and 2 as described above. By way of yet another example, the PTT floor control notification informing the user of UE 102a (PTT listener) about the current PTT floor control with the user of the UE 102d (current PTT speaker) is provided to the user as a display notification on the always on display 216, e.g., when the UE 102a is set in a private or silent mode whereby the speaker 302 is turned off. By way of another example, only a part of the PTT floor control notification may be provided to the user as a voice notification over the speaker 302 or as a display notification over the always on display 216. Additionally, a part of the PTT floor control notification may be provided to the user as a voice or audio notification over the speaker 302 while another part of the PTT floor control notification may be provided to the user as a display notification on the always on display 216. Here, the speaker 302 and the always on display may be established on different UEs of a user. Thus, the user of the UE 102a need not frequently turn on the UE and the display 214.

According to an exemplary embodiment, the user may be provided with an option, e.g., in user settings or PTT settings, to allow usage of at least one of the always on display 216 and the text-to-audio conversion, or none of the always on display 216 and the text-to-audio conversion. Thus, when the user has turned off text-to-audio conversion, the UE 102a may be configured to negotiate or inform during registration of the UE 102a with the PoC server 104 that it does not support text-to-audio conversion.

Figure 3B:
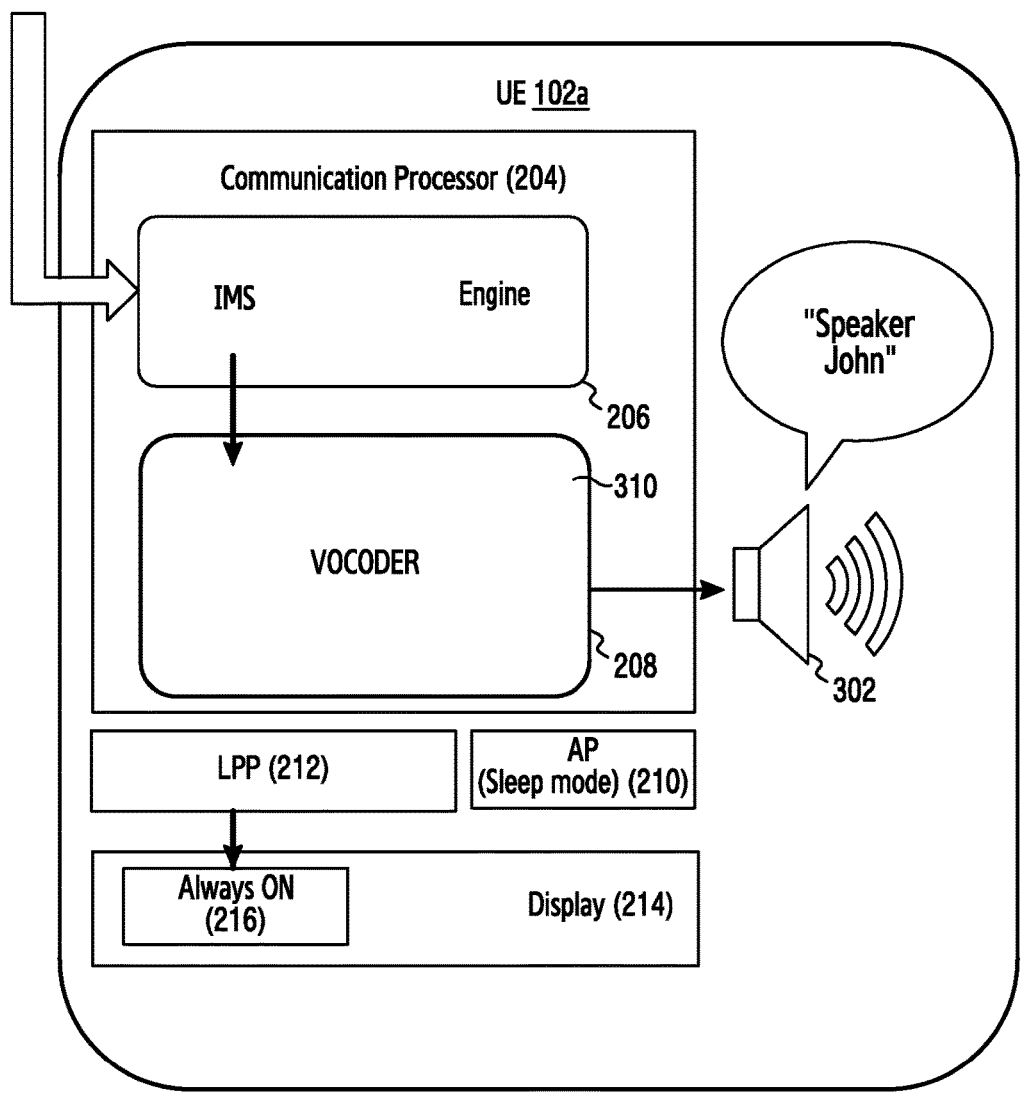

FIG. 3B depicts the UE 102a receiving the audio control data over the control plane, according to an exemplary embodiment. The audio control data (e.g., first audio control data) is processed by IMS engine 206 to generate the audio control data (e.g., second audio control data), wherein the PoC communication system 100 according to an exemplary embodiments enables utilizing the capability of the IMS engine 206 for processing control data. Further, the generated audio control data is processed by a vocoder 310 to generate an output audio notification to be played on the audio device (speaker) 302. In the present exemplary embodiment, the audio format control data is given as normal audio data over a real-time transport protocol (RTP).

According to an exemplary embodiment, the audio control data can be converted to a predefined image control data that can be displayed on the always on display 216 via the direct communication channel.

Figure 3C:
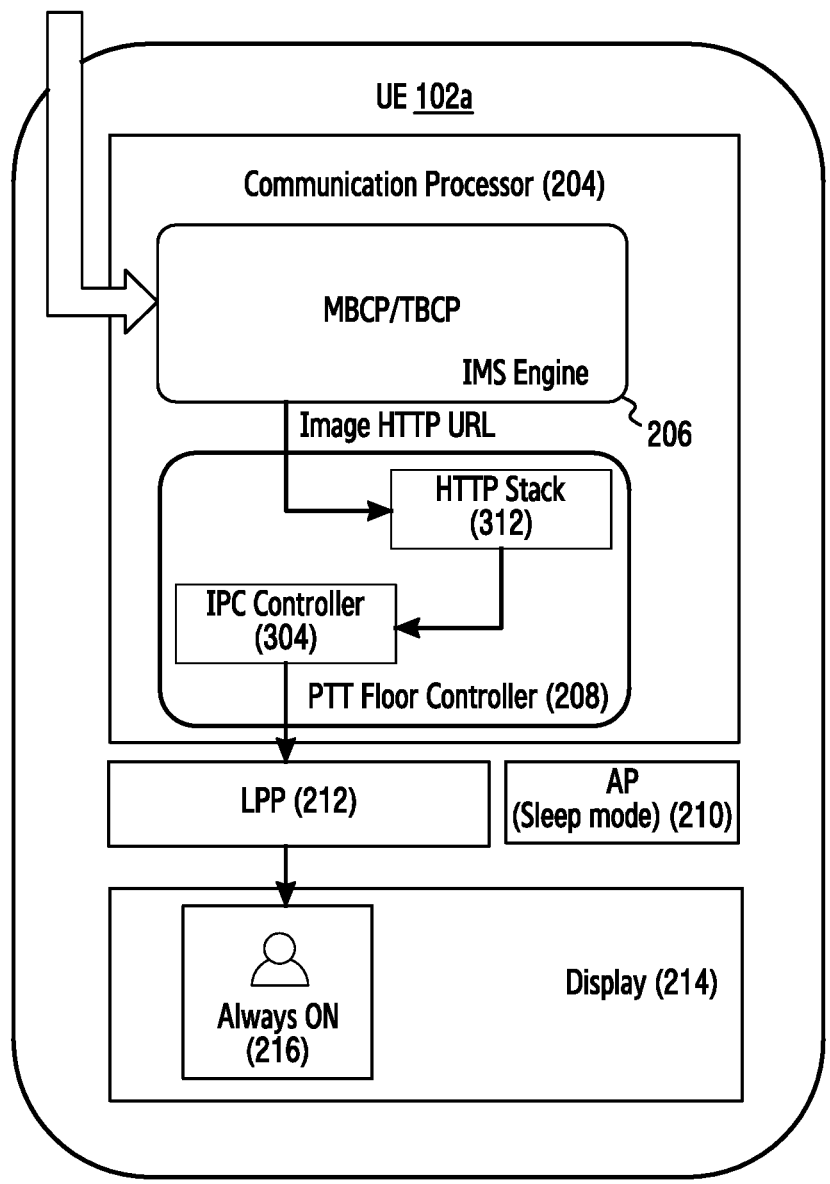

FIG. 3C depicts the UE 102a receiving the image control data over the control plane, according to an exemplary embodiment. The image control data is processed by the IMS engine 206 to generate an image data stored or provided in an HTTP stack 312, wherein the IPC controller 304 forwards the image data directly to the LPP 212 over the direct communication channel between the CP 204 and the LPP 212. The LPP 212 processes and forwards the image data as a display icon corresponding to the PTT speaker (user of the UE 102*d*) on the always on display 216. For example, a PTT floor control notification informing the user of UE 102*a* (PTT listener) about the PTT floor control currently taken up by the user of the UE 102*d* (current PTT speaker) is provided to the user as an image of the PTT speaker on the always on display 216. Thus, the user of the UE 102*a* need not frequently turn on the UE and the display 214, but can update himself by watching the always on display 216. Thus, the PTT floor controller 208 prevents the AP 210, which was switched to sleep mode from waking up.

According to an exemplary embodiment, a corresponding audio control data may be generated for the received image control data, which can be provided as a sound notification to the user.

Figure 3D:
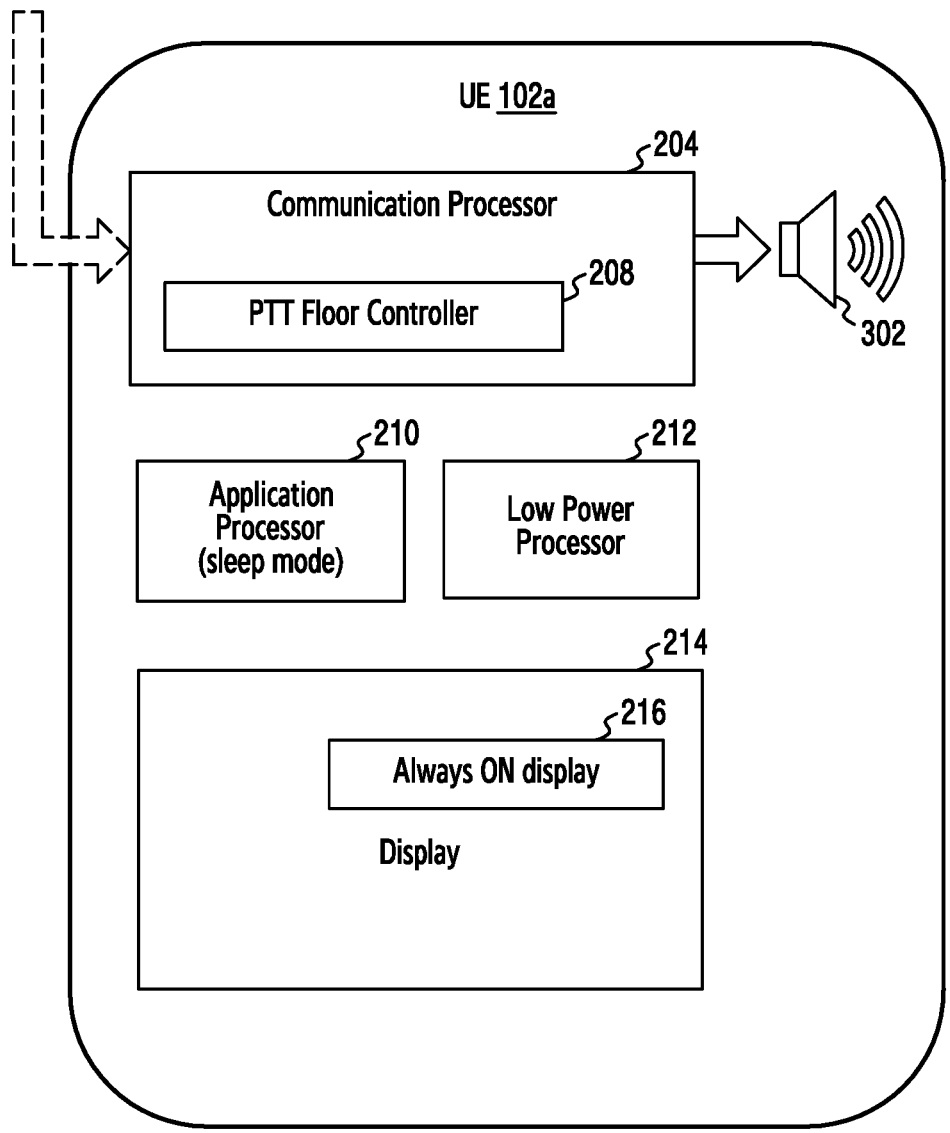

FIG. 3D depicts the UE 102*a* receiving the audio control data over the data plane, according to an exemplary embodiment. The audio control data, which includes information of PTT floor notification informing the user about the current PTT speaker, is received as data multiplexed with the user data. The multiplexed audio control data (e.g., first audio control data) is demultiplexed by the PTT floor controller 208 to generate the audio control data (e.g., second audio control data). This audio control data is played before starting playback or reproduction of the user data. Further, silence gaps between the user voice data are identified by the PTT floor controller 208 and the audio control data is replayed in these gaps to keep the user informed regularly by repeating the audio notification.

Figure 4A:
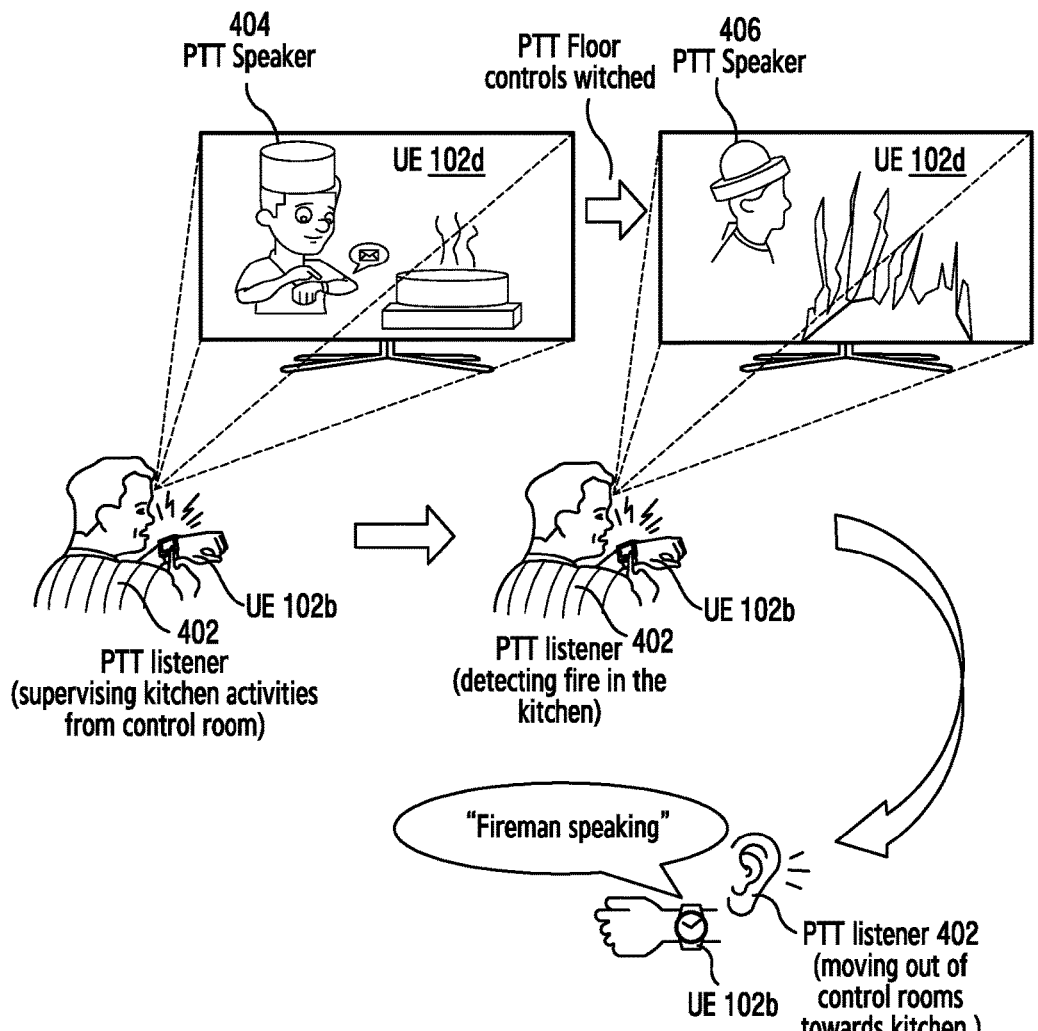
FIG. 4A illustrates an example use case where conversion of the control data of text format to a control data of audio format assists a user (PTT listener) of a UE during an on-going multi-device POC session involving a plurality of participants, according to an exemplary embodiment.

FIG. 4A illustrates an example use case where conversion of text control data to audio control data assists a user (PTT listener) of the UE 102*b* during an on-going multi-device POC session involving a plurality of participants, according to an exemplary embodiment. FIG. 4A depicts a PoC session established between a manger of a hotel (a PTT listener 402 sitting in a control room) with a kitchen chef (a PTT speaker 404) and multiple other users, supervising kitchen activities. The manger 402 has multiple connected devices (UE 102*b* and UE 102*d*) for a PTT video call in progress. Since UE 102*b* is a wearable device with a small screen and voice communication capability, but no camera, the video content is screened on a smart TV (UE 102*d*). However, in a scenario where the manager 402 notices a fire, he may move out of the control room with the TV screen (UE 102*d*) out of sight. Moreover, he may not be in a position to comfortably keep checking the PTT floor control notifications on the wearable device (UE 102*b*). The proposed PoC communication system 100 enables providing PTT floor control notification as an audio played on the speaker of the UE 102*b*. Thus, any change in the PTT speaker such as a floor taken up by a fireman is updated to the manger 402 via audio notification.

Figure 4B:
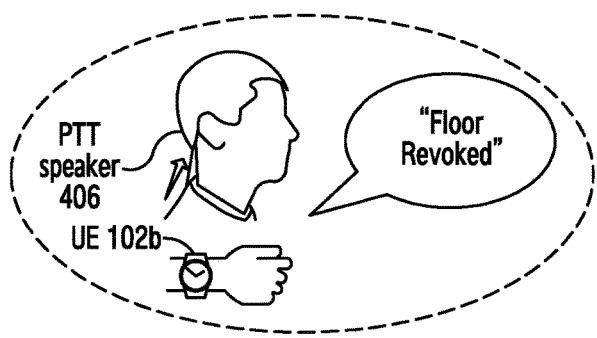
FIG. 4B illustrates an example use case where conversion of control data of text format to control data of audio format assists a user (PTT speaker) in charge of a PTT floor during an on-going POC session, according to an exemplary embodiment.

FIG. 4B illustrates an example use case where conversion of text control data to audio control data assists a user (PTT speaker) in charge of a PTT floor during an on-going POC session, according to an exemplary embodiment.

FIG. 4B depicts a scenario in the PoC communication system at a PTT speaker 406 end. During the established PoC session, due to abrupt technical errors a floor control taken by the PTT speaker 406 may be revoked. In this scenario, the PTT speaker remains unaware that the floor has been revoked and may continue talking. The proposed PoC communication system 100 enables the PoC server 104 to send a floor revoked notification and play the floor revoked notification as an audio control data at the PTT speaker 406 end. Thus, the PTT speaker 406 is made aware through sound notification and may take a required or a desired action.

Figure 5A:
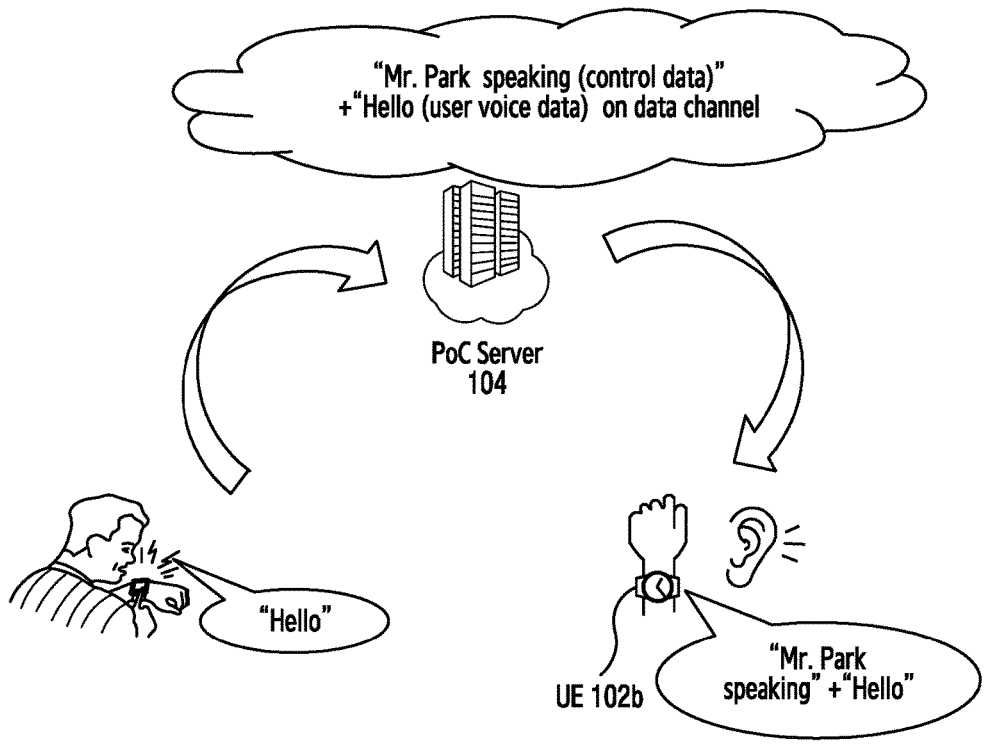
FIGS. 5A and 5B illustrate an example use case, wherein control data is multiplexed with user data in a data plane to provide floor notifications to a user during an on-going PoC session when a UE does not possess text-to-speech conversion capability and/or always on display capability, according to one or more exemplary embodiments.
Figure 5B:
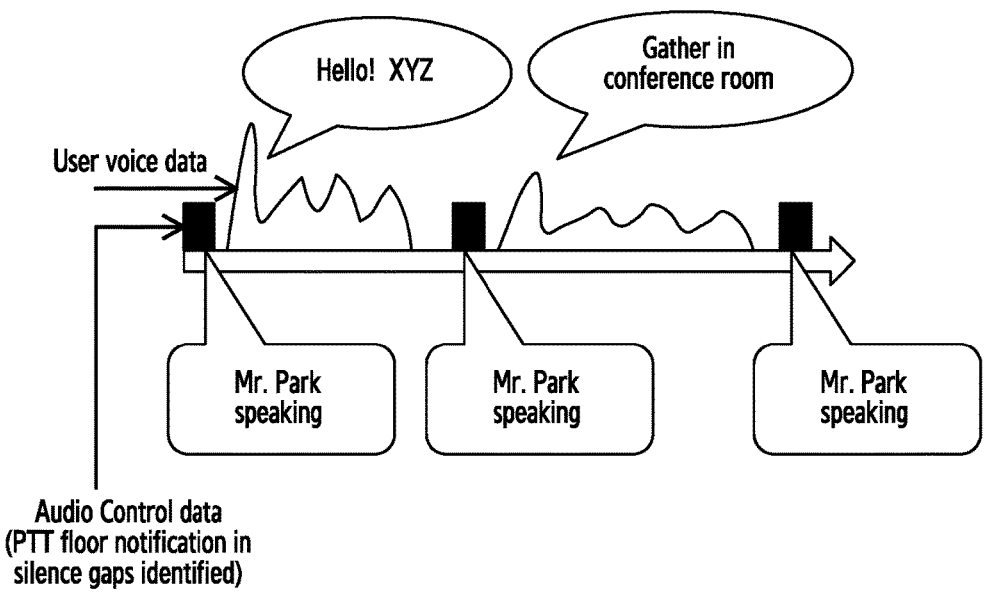

FIGS. 5A and 5B illustrate an example use case, wherein control data is multiplexed with user data in a data plane to provide floor notifications to the user during an on-going PoC session when the UE 102*a* does not possess text-to-speech conversion capability and/or always on display capability, according to one or more exemplary embodiments. In the present exemplary embodiment, the UE 102*b* of the PTT listener is not capable of text-to-audio or -speech conversion. The PTT settings of the UE 102*b* enable the PoC sever 104 to identify UE capabilities. Thus, when the control data for the PTT floor control notification is available in text format, the PoC server 104 can be configured to convert the control data to audio format and multiplex the converted audio control data with user data to be delivered on a data plane. On receiving the user data, the UE 102*b* can demultiplex the audio control data and play the corresponding audio on the speaker before playing the user voice data. Further, as depicted in FIG. 5B, silence gaps between the user voice data are identified by the PTT floor controller 208 and the audio control data is replayed in these gaps to keep the user regularly informed. Thus, if the user of UE 102*b* has missed out on the initial PTT floor control notification announcement, he/she may be updated at one or more later intervals.

Figure 6A:
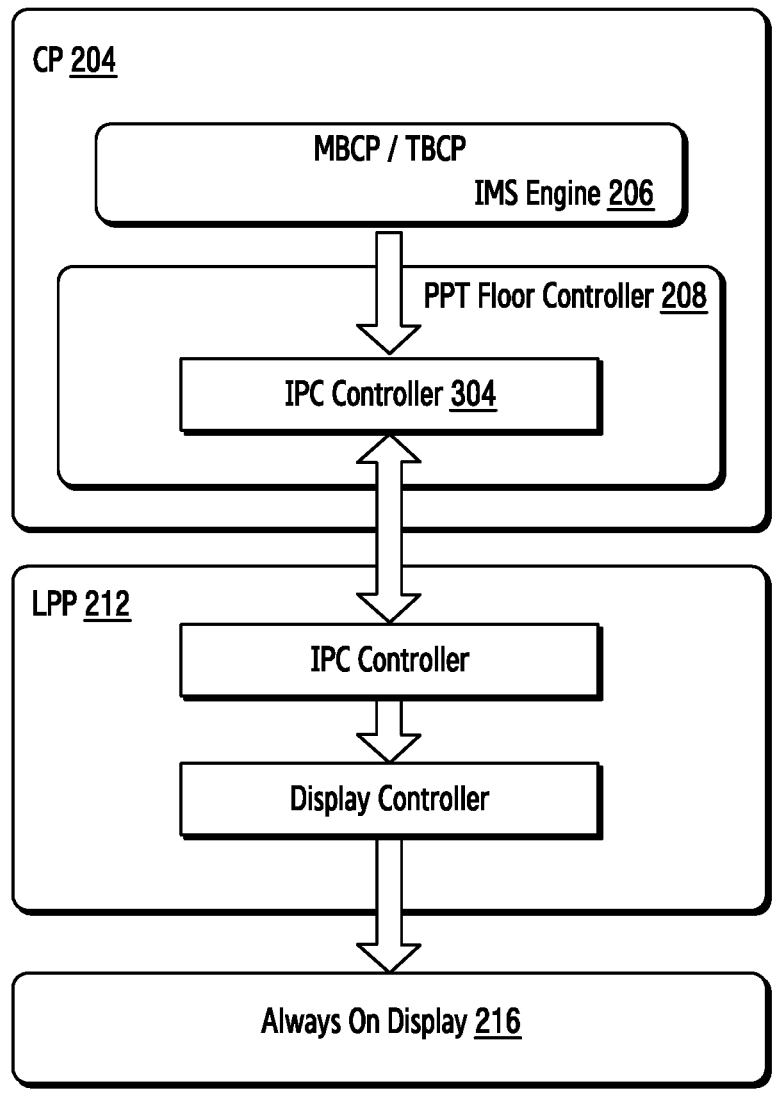
FIG. 6A illustrates a direct communication channel set up between a communication processor (CP) and a low power processor (LPP) of a UE in accordance with a pre-defined CP-LPP inter-process communication (IPC), according to an exemplary embodiment.

FIG. 6A illustrates a direct communication channel set up between a communication processor (CP) and a low power processor (LPP) of a UE 102*a* in accordance with a pre-defined CP-LPP inter-process communication (IPC), according to an exemplary embodiment.

The IPC between the CP 204 and the LPP 212 may be based on a standard hardware interface similar to the AP-CP interface, for example shared memory, DP-RAM, universal synchronous bus (USB), serial, and the like. The IPC controller 304, a sub-module within the PTT floor controller 208, can interpret a media burst control protocol (MBCP)/talk burst control protocol (TBCP) floor control messages and convert these control messages to IPC format.

The IPC controller sub-module on the LPP 212 may interpret the IPC messages received, extract the data, and send the extracted data to a display controller module in the LPP 212. The display controller module can display the received text on the always on display 216.

Figure 6B:
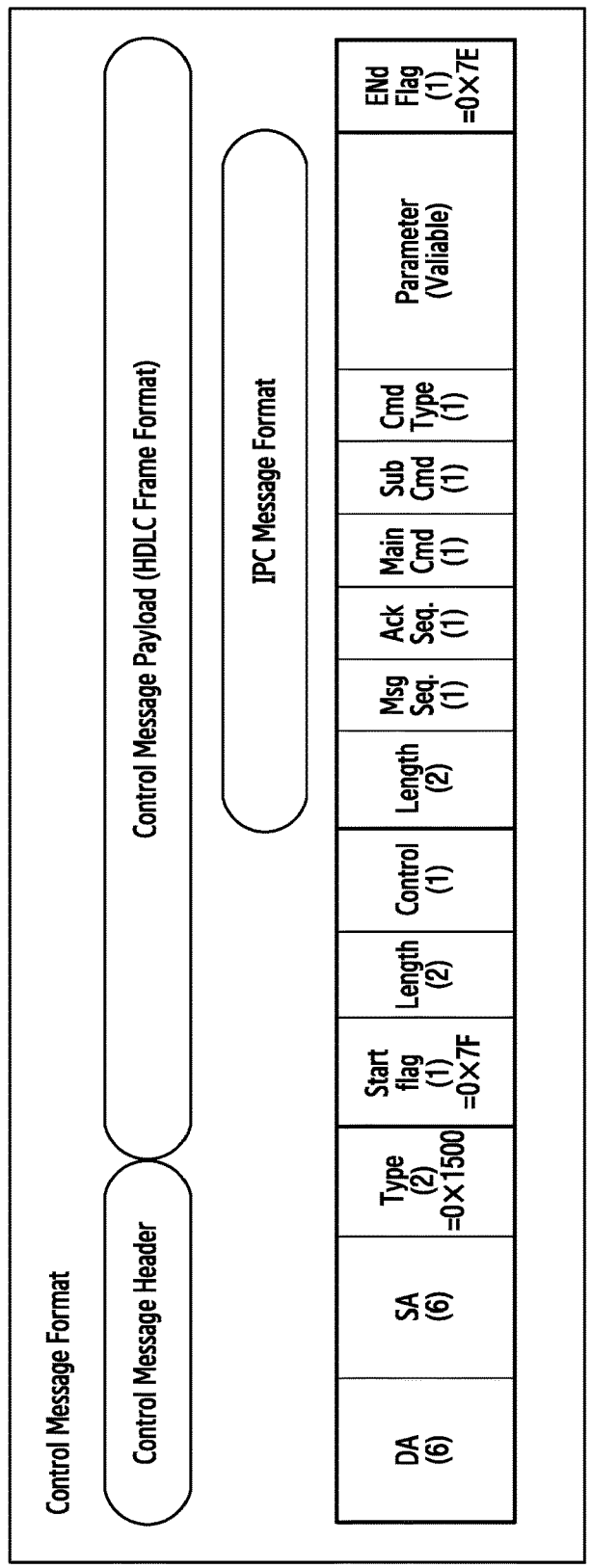
FIG. 6B illustrates a control message format provided for a direct communication channel in accordance with a pre-defined CP-LPP inter-process communication (IPC), according to an exemplary embodiment.

FIG. 6B illustrates a control message format provided for a direct communication channel based on a pre-defined CP-LPP inter-process communication (IPC), according to an exemplary embodiment. As depicted in FIG. 6B, the control message format includes a control message header and a control message payload. IPC command types and an IPC command format according to an exemplary embodiment are provided in Table 1 and Table 2, respectively.

TABLE 1

| Direction | Command type | Description | value |
|---|---|---|---|
| CP to LPP | EXECUTE | Request the action to LPP | 0X01 |
| | GET | Read the data from LPP | 0X02 |
| | SET | Write the data to LPP | 0X03 |
| | CONFIRM | Response of INDICATION command | 0X04 |
| | EVENT | Notify status of CP | 0X05 |
| LPP to CP | INDICATION | Request action or data to CPP | 0X01 |
| | RESPONSE | Response of GET/SET command | 0X02 |
| | NOTIFICATION | Notify status of LPP | 0X03 |

TABLE 2

| Field | Length | Description |
| --- | --- | --- |
| SUB_CMD_VALUE | 1 | Value |
| CMD_TYPE | 1 | Command type |
| DATA | ... | ... |

Figure 7:
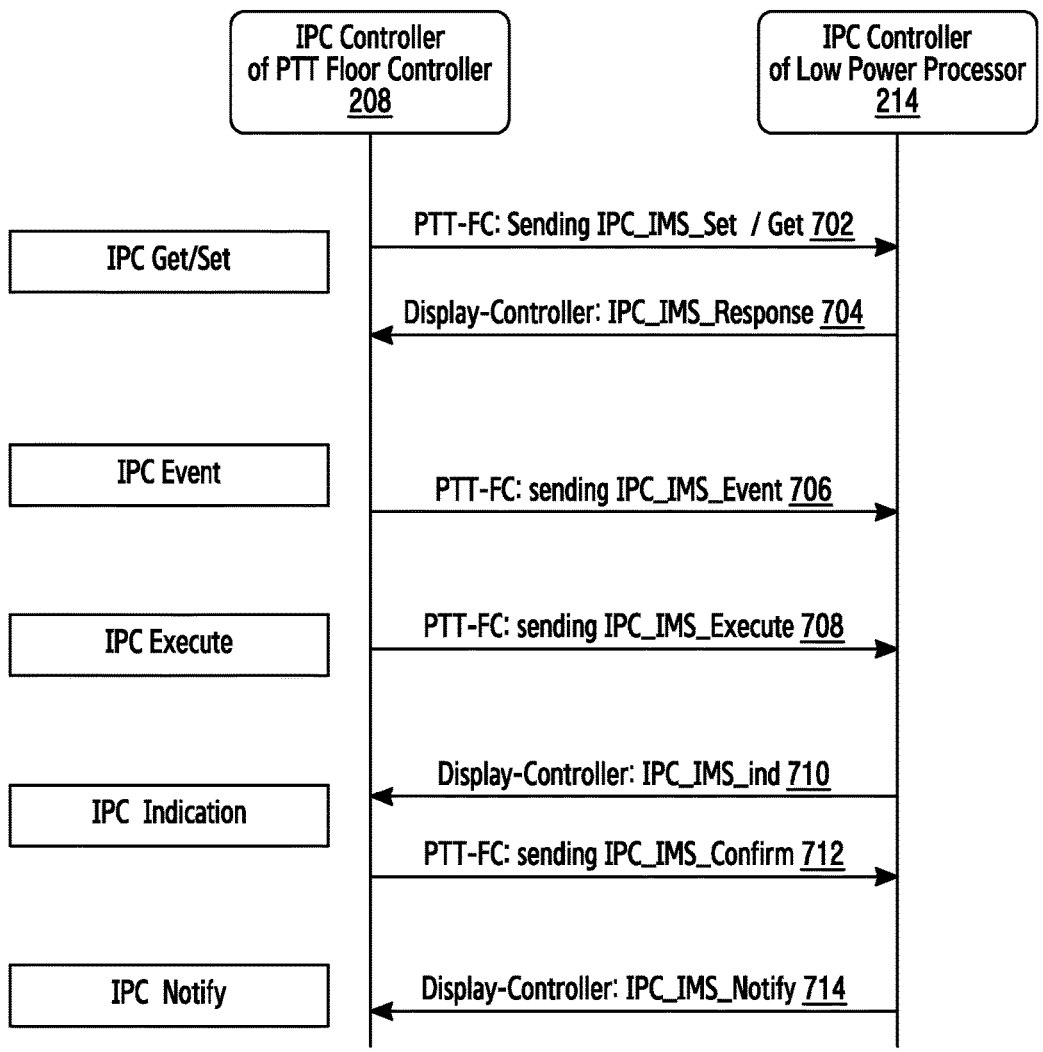
FIG. 7 illustrates a sequence diagram for a pre-defined CP-LPP IPC, according to an exemplary embodiment.

FIG. 7 illustrates a sequence diagram for a pre-defined CP-LPP IPC, according to an exemplary embodiment. The communication between the IPC Controller 304 of the PTT floor controller 208 and the IPC controller of the LPP 214 based on the CP-LPP IPC method according to an exemplary embodiment is depicted. The PTT Floor Controller 208 initiates the communication and sends the PTT-FC: Sending IPC_IMS_Set/Get to the LPP 214 (operation 702). In response, the LPP 214 sends Display-Controller: IPC_IMS_Response (operation 704). Further, the PTT floor controller 208 sends PTT-FC: sending IPC_IMS_Event and PTT-FC: sending IPC_IMS_Execute (operations 706 and 708). In response, the PTT floor controller 208 receives Display-Controller: IPC_IMS_ind and sends PTT-FC: sending IPC_IMS_Confirm to the LPP 214 (operations 710 and 712). Further, in response, the PTT floor controller 208 receives Display-Controller: IPC_IMS_Notify (operation 714).

Figure 8:
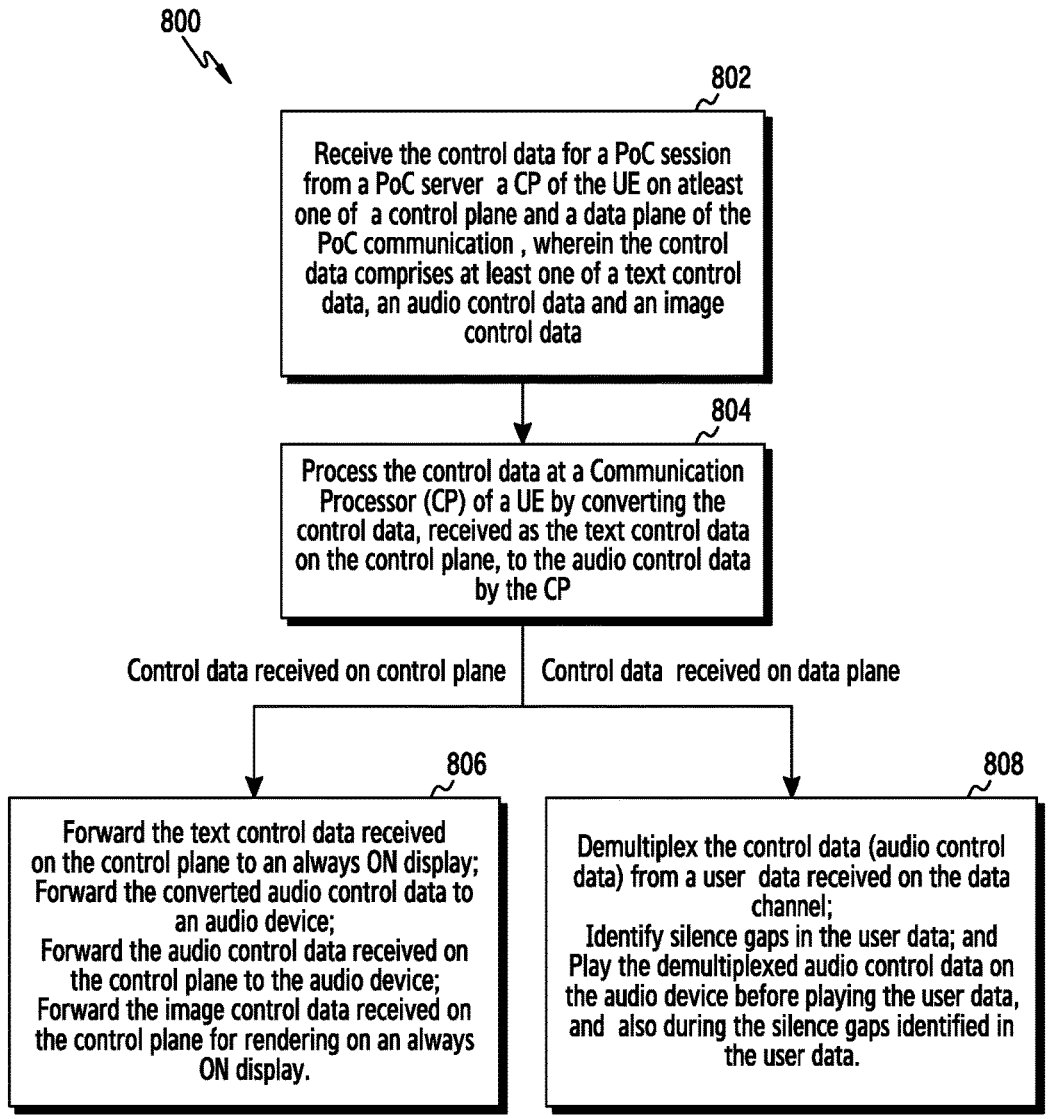
FIG. 8 is a flow diagram illustrating a method for managing control data in a UE, according to an exemplary embodiment.

FIG. 8 is a flow diagram illustrating a method 800 for managing control data in a UE 102a, according to an exemplary embodiment. At operation 802, the method 800 includes allowing the CP 204 to receive the control data for the PoC session from the PoC server 104. In an exemplary embodiment, the control data can be on the control plane, wherein the control data can be the text control data as used in a related art standard for PoC communication or, in addition, can be the audio control data or the image control data.

According to an exemplary embodiment, if the UE 102a does not have text-to-speech capability, the PoC server 104 can convert text control data to audio control data that can be multiplexed with user data on a data channel and sent to the UE 102a.

At operation 804, the method 800 includes allowing the CP 204 to process the control data by converting the control data, received as the text control data on the control plane, to the audio control.

The method may further include operations 806 and 808. At operation 806, the method 800 allows the CP to forward the text control data received on the control plane to the always on display 216. Additionally, the text control data, converted to the audio control data is forwarded to the audio device such as the speaker 302. If the received control data is the audio control data, then the audio control data is forwarded to the audio device. If the received control data is the image control data, then the image control data is forwarded for rendering on the always on display 216.

When the control data is received as the audio control data on the data plane, then at operation 808, the method 800 allows the CP 204 to demultiplex the control data (audio control data) from the user data received on the data channel. The silence gaps in the user data are identified and the demultiplexed audio control data is played on the audio device before playing the user data, and/or during the silence gaps identified in the user data.

The control data processing for the text control data received over the control plane, the audio control data received over the control plane or the data plane, and the image control data received over the control plane is as explained in conjunction with FIGS. 3A through 3D respectively. Further, use case scenarios for the same may be as explained with reference to FIGS. 4A, 4B, 5A, and 5B.

The direct communication channel set up between the CP 204 and through the LPP 212 is as explained in conjunction with FIGS. 6A, 6B, and 7.

According to an exemplary embodiment, the method 800 allows the UE (such as UE 102a, UE 102b, or the like) to manage the On/Off state of the always on display 216, to thereby provide further power saving of the UE. The method 800 may include detecting one or more pre-defined events such as an input from a proximity sensor on the UE, a device state of the UE, inputs from motion sensors on the UE, and so on. Upon detection of these one or more events, the always on display may be turned off to enable further power saving. Some example scenarios are provided below:

Scenario 1: While the UE 102a is in a user's pocket or bag, based on inputs from a proximity sensor, the always on display 216 can be turned off.

Scenario 2: Based on inputs from motion sensors on the UE 102b, which may be a wearable device, the UE 102b may be identified to be in idle state and the always on display 216 can be turned off. For example, where the UE 102b is not worn by the user, after a particular idle time is detected, the always on display 216 may be turned off. In another example, where the UE 102b is worn by the user, the always on display 216 can be turned on only on motion detection. For example, while a watch as the UE 102b is worn, but there is no hand movement, the always on display 216 may be turned off.

The various actions and operations in the above-described method 800 may be performed in the order presented, in a different order, or simultaneously. Further, in some exemplary embodiments, some actions and operations may be omitted.

Figure 9A:
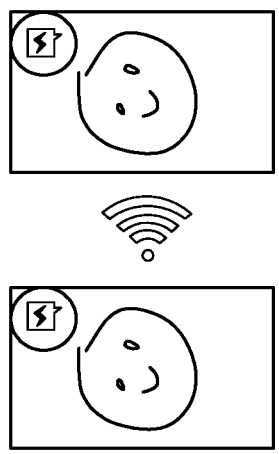
FIGS. 9A through 9D illustrate a plurality of applications that can utilize text control data to audio control data conversion and a CP to LPP direct communication channel, according to one or more exemplary embodiments.

FIGS. 9A through 9D illustrate a plurality of applications that can utilize the text control data to audio control data conversion and the CP to LPP direct communication channel, according to one or more exemplary embodiments. As depicted in FIG. 9A, differently-abled PTT users can utilize the sound notification feature to readily listen to a floor status notifications while on the move with better battery savings. Hearing impaired users can utilize the always on display 216 without worrying about battery drain as an effect of the display 214 turning or being on. However, the display 214 can be explicitly turned on only when desired or required according to one or more exemplary embodiments.

Figure 9C:
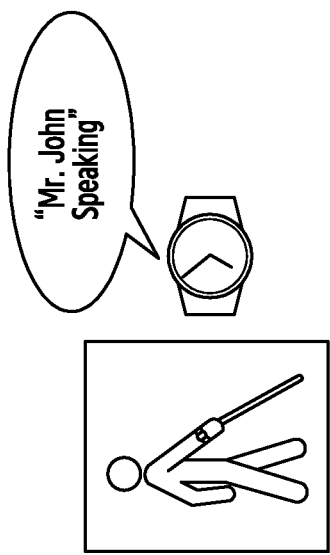
Figure 9B:
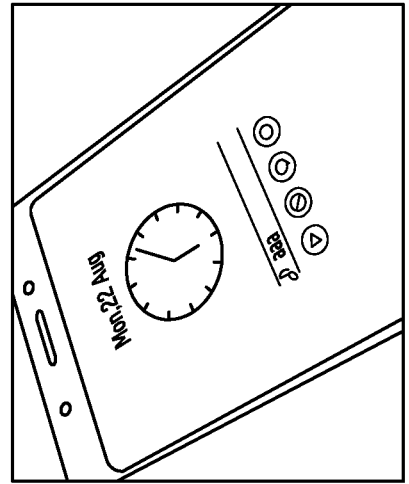

As depicted in FIG. 9B, low power consuming applications, for example buzz and chat, which have a low memory footprint, can be run on the low power processor (LPP 212) that can directly interact with the CP 204 for data exchange (e.g., MSRP can be used based on IMS packet data).

As depicted in FIG. 9C, example applications on the UE such as Shared Canvas and Scribbling are standardized in RCS6.0 Crane latest version of GSMA specifications. This use case can be realized on the always on display 214 (CP-LP interaction).

Figure 9D:
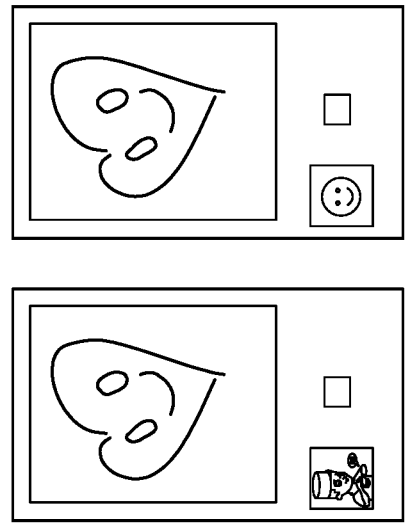

As depicted in FIG. 9D, quick notifications of Alarm/Event, chat updates like a user joined/went offline, PTT updates of floor control—user join or left—can be displayed on the always on screen, without waking up the AP 210 using the direct communication channel based on the IPC described in conjunction with FIGS. 6A, 6B, and 7. This is particularly useful in a case that the UE is set to a silent mode.

Figure 10:
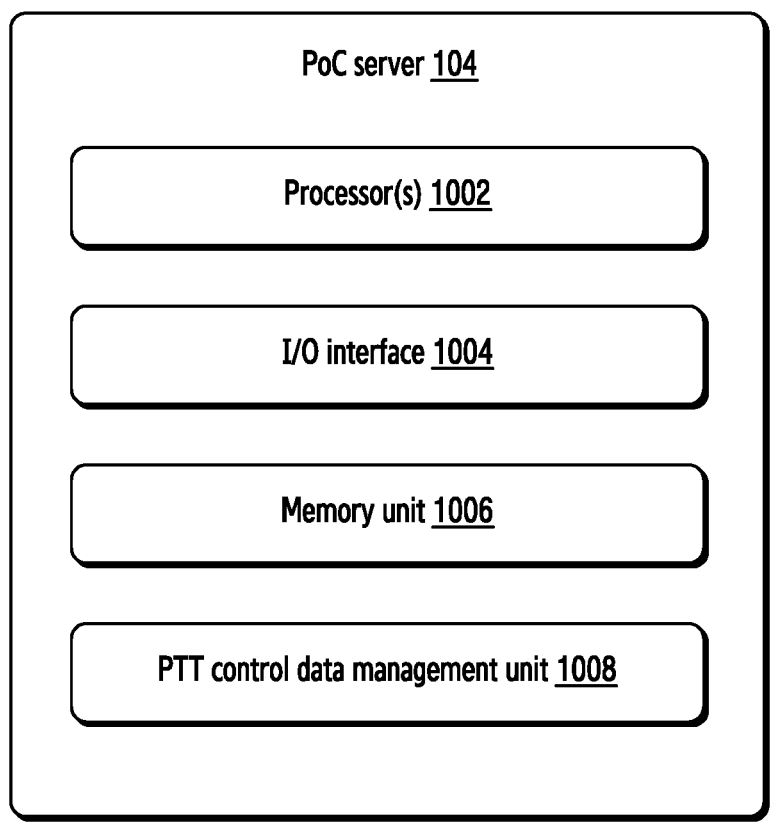
FIG. 10 illustrates a plurality of components of a PoC server in a POC communication for managing control data, according to an exemplary embodiment.

FIG. 10 illustrates a plurality of components of a PoC server 204 in a POC communication for managing control data, according to an exemplary embodiment. Referring to FIG. 10, the PoC server 204 includes one or more processors 1002 for processing the control data and other data, and a memory unit 1006 (e.g., memory) for storing the multiple data generated during the PTT floor notification control management. The PoC server 204 further includes an I/O interface 1004 providing a communication interface, a graphical user interface, and the like. The communication interface enables communication between the PoC server 104 and other devices in the PoC communication system 100 over one or more communication channels such as cellular, Wi-Fi, and the like. The PoC server also includes a PTT control data management unit 1008 (e.g., PTT data manager) configured to receive control messages such as PTT floor notifications from the UE 102d (PTT speaker) and send the control data to one or more PTT listeners (UE 102a, 102b, and 102c respectively) in the PoC communication system 100. The PoC server 104 may be configured to send the control message in a text format, an audio format, and/or an image format and the control data may be sent over the control channel or the data channel as explained in conjunction with FIGS. 3A through 3D above.

Figure 11:
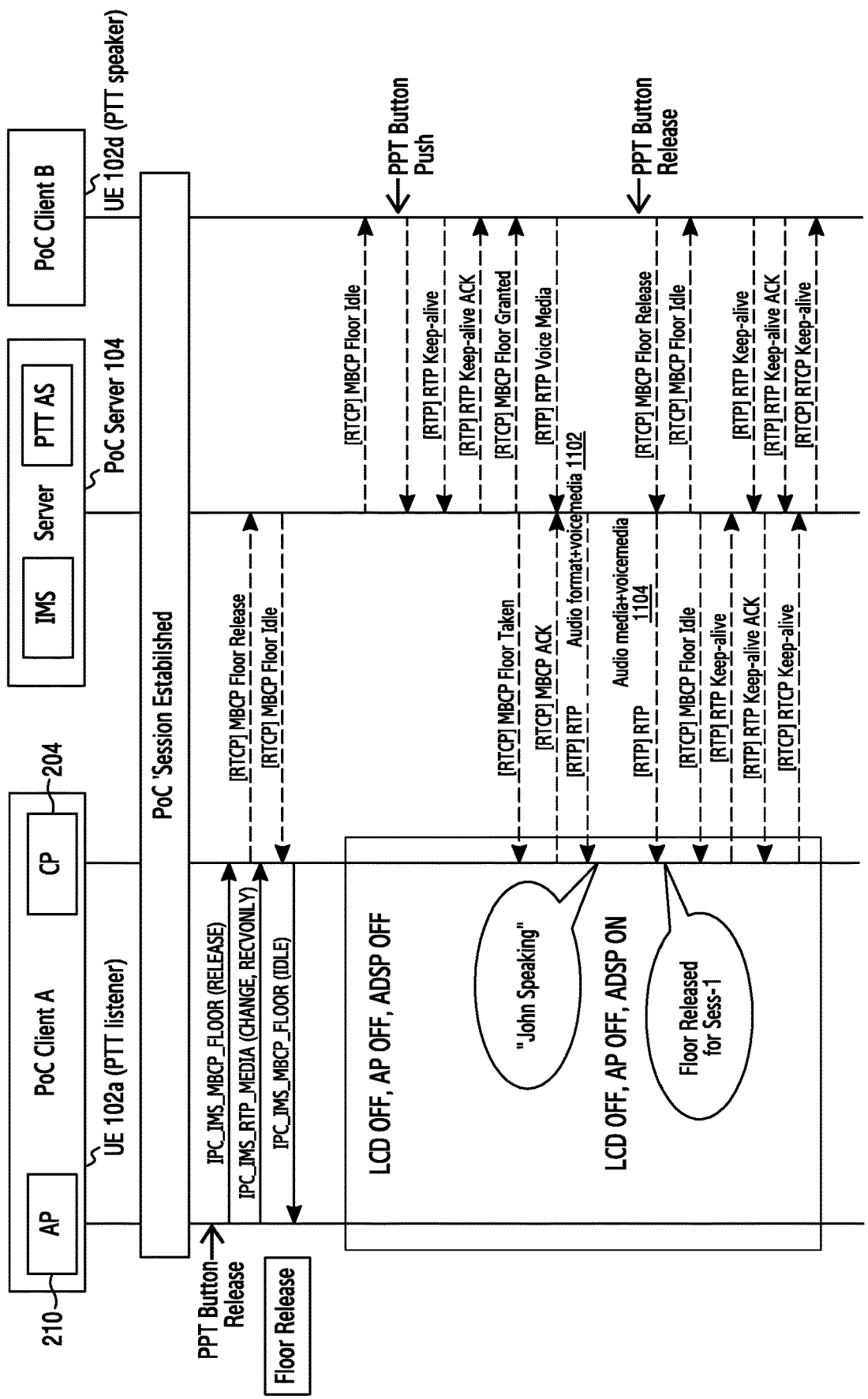
FIG. 11 illustrates a sequence diagram depicting communication between a PoC server and a UE including control data embedded within a data plane where the UE does not support a text-to-speech mechanism, according to an exemplary embodiment.

FIG. 11 illustrates a sequence diagram depicting communication between a PoC server and a UE including control data embedded within a data plane where the UE does not support a text-to-speech mechanism, according to an exemplary embodiment. FIG. 11 depicts a standard exchange of control plane and data plane signaling between UE 102a (PoC Client A) and the PoC server 104. The method according to the present exemplary embodiment modifies operations 1102 and 1104 as depicted to embed control data within the data plane.

As depicted, the PoC client A (UE 102a) may include "Preferred Language & Text-to-speech for PTT Notifications" in PTT Settings.

If the PoC client A (UE 102a) does not support "text-to-speech," the PoC server 104 may be configured to append floor control notification data (control data) in the audio packets (operation 1102) along with the actual audio data from the PTT speaker (UE 102d) and send the packets over to the PTT listener (UE 102a). The PoC server 104 may be configured to detect the silence packets from the PTT speaker (UE 102d) and may insert the floor control information (e.g., "John speaking") and to send the floor control information to the PTT listener (UE 102a) for rendering as explained in conjunction with FIGS. 5A and 5B)

Figure 12:
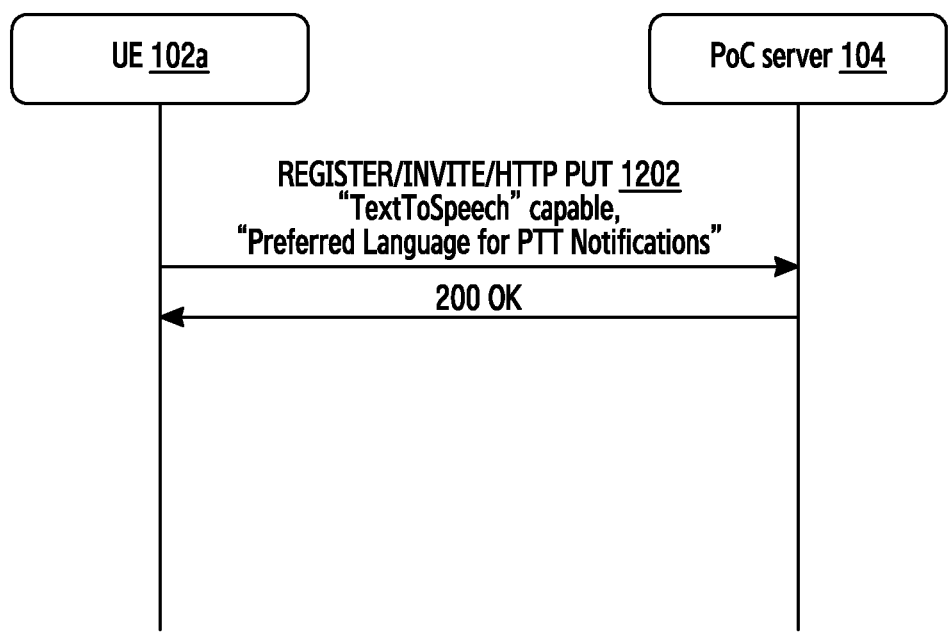
FIG. 12 illustrates negotiations between a UE (PoC client) and a PoC server for indicating text-to-speech capability of the PTT client, according to an exemplary embodiment.

FIG. 12 illustrates negotiations between a UE 102a (PoC client) and a PoC server 104 for indicating text-to-speech capability of a PTT client, according to an exemplary embodiment.

The UE 102a can be configured to advertise 1202 the text-to-speech capability within its session initiation protocol (SIP) message as part of a header or a multipart body like session description protocol (SDP), extensible markup language (XML), and the like or user profile configuration provisioning using hyper text transfer protocol (HTTP) protocol to notify the PoC server 104. Further, the UE 102a may be configured to advertise the "Preferred Language for PTT Notifications" through an SIP message as part of a header or a multipart body like the SDP, the XML and so on, or the HTTP protocol to notify the PoC server 104 in the case that the UE 102a does not support text-to-speech.

Exemplary embodiments disclosed herein can be implemented through at least one software program running on at least one hardware device and performing network management functions to control the network elements. The network elements and components shown in FIGS. 1, 2, 3A through 3D, 4A, 4B, 5A, 5B, 6A, 6B, 7, 8, 9A through 9D, and 10 through 12 include blocks which can be at least one of a hardware device (e.g., circuitry, one or more processors, etc.), a software component or module, or a combination of a hardware device and a software component or module.

It should be understood that exemplary embodiments described herein should be considered in a descriptive sense and not for purposes of limitation. For example, a single element in the above description may be divided into a plurality of elements, and a plurality of elements in the above description may be combined into a single element. Descriptions of features or aspects within each exemplary embodiment should typically be considered as available for other similar features or aspects in other exemplary embodiments. It should also be understood that the phraseology or terminology employed herein is for the purpose of description and not for limitation. Therefore, while exemplary embodiments herein have been described with reference to certain exemplary embodiments, those skilled in the art will recognize that exemplary embodiments herein can be practiced with modification within the spirit and scope of the present inventive concept(s) as described herein.

What is claimed is:

1. A method for operating a user equipment (UE) comprising an application processor (AP) and a communication processor (CP), the method comprising:
   receiving, by the CP, control data for a PoC session from a PoC server; and
   processing, by the CP, the received control data,
   wherein the processing, by the CP, comprises forwarding the at least part of the control data of text format to an always on display via a communication channel between the CP and a low power processor (LPP) according to a pre-defined CP-LPP inter-process communication (IPC).

2. The method as claimed in claim 1, wherein the processing further comprises at least one of:
   converting the at least part of the control data of text format to a data of audio format and forwarding the converted data of audio format to an audio device,
   based on receiving at least part of the control data of audio format on a control plane, forwarding the at least part of the control data of audio format to the audio device, and
   based on receiving at least part of the control data of image format on the control plane, forwarding the at least part of the control data of image format to the always on display for rendering via the LPP.

3. The method as claimed in claim 1, wherein:
   at least part of the control data of audio format is multiplexed with a user data of a data plane if the at least part of the control data of audio format is received by the UE on the data plane; and
   the PoC server transmits the at least part of the control data of audio format multiplexed with the user data to the UE incapable of text-to-speech conversion.

4. The method as claimed in claim 3, wherein a capability of the UE with respect to the text-to-speech conversion is transmitted to the PoC server through a capability negotiation during registration of the UE with the PoC server for the PoC communication.

5. The method as claimed in claim 3, wherein the processing further comprises:
   demultiplexing the at least part of the control data of audio format from the user data of the data plane;

identifying silence gaps in the user data of the data plane; and playing the at least part of the control data of audio format on an audio device before playing the user data or during the silence gaps identified in the user data.

6. The method as claimed in claim 1, wherein the control data further comprises at least one of at least part of the control data of audio format and at least part of the control data of image format, and wherein the at least part of the control data of audio format indicates the current PTT speaker of the PoC session in an audio format, and the at least part of the control data of image format indicates the current PTT speaker of the PoC session in an image format.

7. The method as claimed in claim 1, wherein the UE receives, processes, and outputs the control data without waking up an application processor of the UE.

8. A user equipment (UE), the UE comprising:
- a communication processor (CP) comprising a push-to-talk (PTT) controller;
- an application processor (AP);
- a low power processor (LPP); and
- a display,
- wherein the CP is configured to:
- receive control data for a PoC session from a PoC server; and
- forward at least part of the control data of text format to an always on display via a communication channel between the CP and a low power processor (LPP) according to a pre-defined CP-LPP inter-process communication (IPC).

9. The method as claimed in claim 1 or the UE as claimed in claim 8,
wherein the processing by the CP further comprises converting at least part of the control data of text format to a data of audio format.

10. The method as claimed in claim 1 or the UE as claimed in claim 8,
wherein the control data is received on at least one of a control plane and a data plane.

11. The UE as claimed in claim 10, wherein the PTT controller of said CP is configured to perform at least one of:
converting the at least part of the control data of text format to a data of audio format and forwarding the converted data of audio format to an audio device;
based on receiving at least part of the control data of audio format on a control plane, forwarding the at least part of the control data of audio format to the audio device; and
based on receiving at least part of the control data of image format on the control plane, forwarding the at least part of the control data of image format to the always on display for rendering via the LPP.

12. The UE as claimed in claim 10, wherein:
at least part of the control data of audio format is multiplexed with a user data of a data plane if the at least part of the control data of audio format is received by the UE on the data plane; and the PoC server transmits the at least part of the control data of audio format multiplexed with the user data to the UE incapable of text-to-speech conversion.

13. The UE as claimed in claim 12, wherein the PTT controller is configured to transmit a capability of the UE with respect to the text-to-speech conversion to the PoC server through a capability negotiation during registration of the UE with the PoC server for the PoC communication.

14. The UE as claimed in claim 12, wherein the CP is further configured to process:
demultiplexing the at least part of the control data of audio format from the user data of the data plane;
identifying silence gaps in the user data of the data plane; and
playing the at least part of the control data of audio format on an audio device before playing the user data or during the silence gaps identified in the user data.

15. The UE as claimed in claim 10, wherein the display is an always on display.

16. The UE as claimed in claim 10, wherein the control data further comprises at least one of at least part of the control data of audio format and at least part of the control data of image format, and wherein the at least part of the control data of audio format indicates the current PTT speaker of the PoC session in an audio format, and the at least part of the control data of image format indicates the current PTT speaker of the PoC session in an image format.

17. A push-to-talk over cellular (PoC) server for managing control data in a PoC communication, the PoC server comprising:
a push-to-talk (PTT) control data manager, wherein the PTT control data manager configured to:
transmit, to a user equipment (UE) if the UE is a PTT listener UE, the control data for a PoC session on at least one of a control plane and a data plane, wherein the control data comprises at least one of at least part of the control data of text format, at least part of the control data of audio format, and at least part of the control data of image format; and
transmit, to the UE, if the UE is incapable of text-to-speech conversion, the at least part of the control data of audio format on the data plane by multiplexing with user data on the data plane.

18. The PoC server as claimed in claim 17, wherein the PTT control data manager is configured to receive a capability of the UE with respect to the text-to-speech conversion through a capability negotiation during registration of the UE with the PoC server for the PoC communication.

19. The PoC server as claimed in claim 17, wherein the PTT control data manager is configured to:
convert the control data received from a PTT speaker UE to at least part of control data of audio format;
identify silence gaps in the user data; and
multiplex the at least part of the control data of audio format with the user data; and
transmit the multiplexed data on the data plane to the PTT listener UE.

* * * * *